Patented Jan. 2, 1951

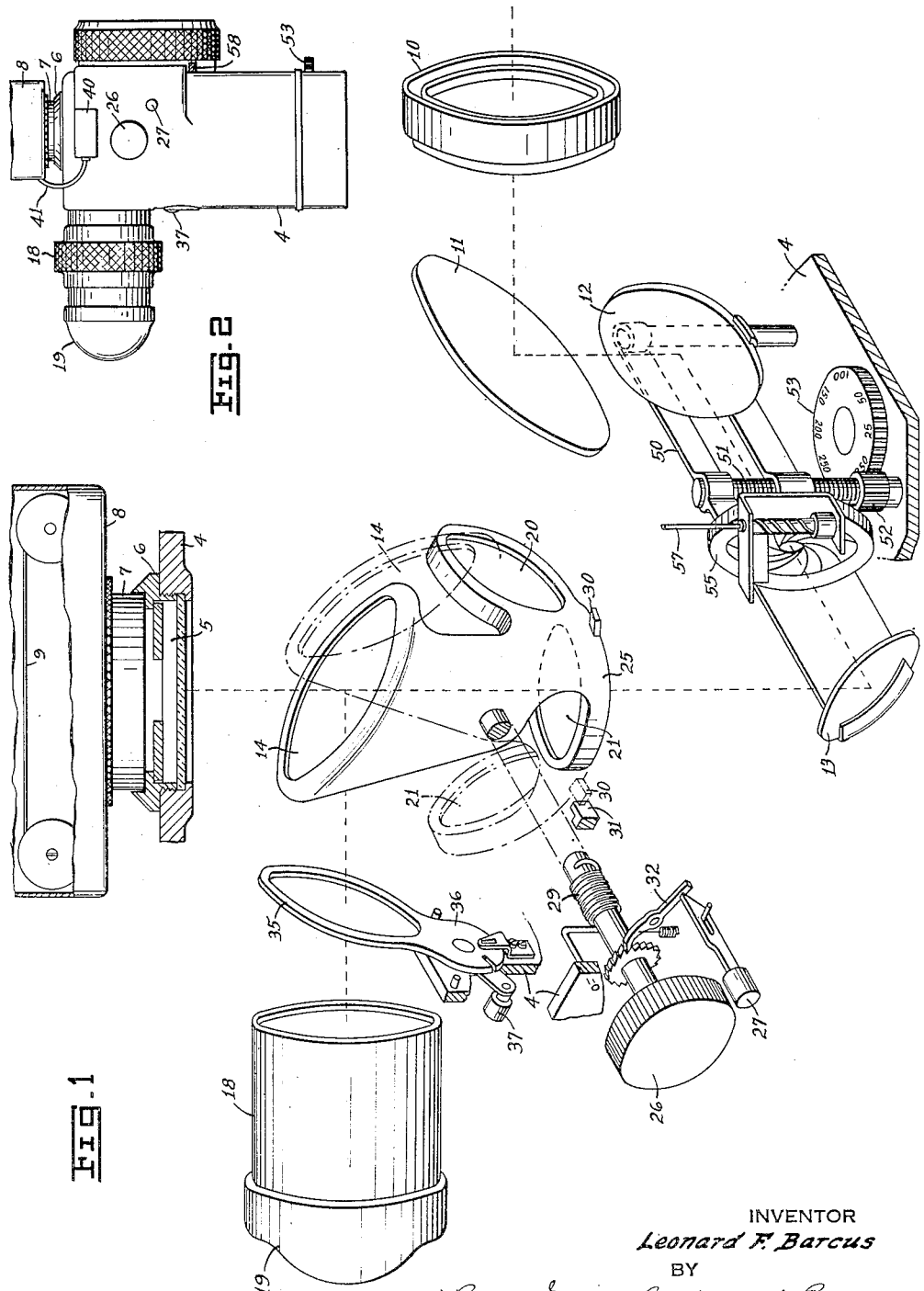

2,536,866

UNITED STATES PATENT OFFICE 2,536,866

REFLEX CAMERA COMBINATION, INCLUDING TELEPHOTO LENS AND TELESCOPE FINDER

Leonard F. Barcus, Yonkers, N. Y., assignor to Farrand Optical Co., Inc., a corporation of New York Application January 16, 1947, Serial No. 722,309

6 Claims. (Cl. 95—42)

This invention relates to telephoto lenses for cameras and, more particularly, to a telephoto lens array of variable focus which is compact and of rigid construction, but which incorporates means for presenting separately for visual observation the image formed thereby in the same focus as that existing on the film of the camera.

The telephoto lens of the prior art seeks, by adding a negative lens behind the usual positive lens, to reduce the back focus of the resulting lens system while retaining the high focal length required to obtain adequately large images of distant objects. It must, however, protrude from the front of the camera by at least the separation of the two lenses and, if the system is of high power, this may be a considerable distance. The result is a structure which is awkward and delicate mechanically, the telephoto lens often out-weighing the camera from which it is supported.

A particular problem with telephoto lenses is that of focusing. For telephoto lenses of focal length up to some 200 mm., it is possible to produce sufficiently accurate focus by measuring the distance to the object to be photographed with a range finder and adjusting the separation of the elements of the telephoto lens to correspond therewith according to a calibration on the telephoto lens mount. If the telephoto lens is of higher focal length, however, the enormous variation in position of the focal plane in the object space which accompanies even small changes in the separation of the elements makes this method too inaccurate, in view of the small depth of focus possessed by such lenses. Proper focusing can be obtained only by examination of the image produced by the telephoto lens on a ground glass screen. This has involved in the past either a reflex camera, or the bulk of a reflex mechanism incorporated between the telephoto lens and the camera, with the disadvantage that a ground glass screen of full picture size must be provided at a distance behind the telephoto lens equal to the distance to the plane of the film. The image presented by such a reflex mechanism will also be either inverted top for bottom, or reverted right for left, or both, unless a bulky erecting system is interposed between the ground glass screen and the magnifier provided for viewing.

It is an object of the present invention to provide a telephoto attachment of high power for photographic cameras which is compact in arrangement and construction, and which enables the photographer to focus the telephoto objective by direct examination of an erect image produced essentially by the telephoto objective itself. An additional object of the present invention is to provide an adaptation of the telephoto lens whereby it can serve as a terrestrial telescope enjoying the same high power as the telephoto lens, but folded into a compact structure which makes its holding easy and steady.

My invention comprises, basically, a positive lens which serves as the positive element of the telephoto system and also as the objective of the telescope, and a rotating mount serving to provide either a telephoto lens by presenting a negative lens to the rays passing through the positive lens, or a telescope by diverting those rays into an eyepiece by means of a mirror. The instrument has a single focusing adjustment which varies the separation of the positive lens from the rotating mount, and the elements are computed so that objects seen to be in focus when viewed through the eyepiece, when the instrument is used as a telescope, are in focus at the plane of the film in the camera when the instrument is used as a telephoto lens.

My invention will be better understood from the following detailed description, which is to be considered in conjunction with the accompanying drawings in which:

Fig. 1 is an exploded view of the components of an embodiment of my invention; and Fig. 2 is a side elevation of the exterior of an embodiment of my invention.

Referring to Fig. 1, a positive lens 10 and an eyepiece 18 are mounted in a light-weight housing 4. The housing 4 is provided with an appropriately disposed opening 5 surrounded by a bayonet ring 6 onto which may be fitted, by means of an adaptor ring 7, a photographic camera 8 in which the telephoto lens is to produce an image of the object to be photographed on a photosensitive surface or film 9. The lens 10 serves as a telescope objective in conjunction with the eyepiece 18 for direct visual observation, for example, of distant objects sought to be photographed. In order to reduce the length of the instrument and to erect the image produced by the lens 10, the lens 10 and the eyepiece 18 are provided with a common optical axis by means of a set of plane mirrors instead of being disposed along a single geometrical axis in a tube. In this way a more compact and rigid construction and mounting of the elements of the telescope and telephoto lens in conjunction with the camera is achieved than would be possible

3 if the telephoto lens were hung from the camera in the normal type of telescope tube.

Light entering the system through the positive lens 10 is reflected through 90 degrees into a path perpendicular to the axis of the lens 10 at a plane mirror 11 inclined at an angle of 45 degrees to the axis of the lens 10. The light reflected at the mirror 11 next suffers a second reflection through 90 degrees into a path perpendicular to the path joining the mirrors 11 and 12 and perpendicular also to the axis of the lens 10, the mirror 12 being inclined at 45 degrees to the path joining the mirrors 11 and 12 but being parallel to the axis of the lens 10. After passing through an iris 55, the light is reflected through 90 degrees a third time from a plane mirror 13 into a path parallel but oppositely directed to that leading from the mirror 11 to the mirror 12. The mirror 13 is thus oriented at 90 degrees to the mirror 12 and is also parallel to the axis of the lens 10. The light reflected from the mirror 13 next either traverses a negative lens 21 of low power for the correction of zonal aberration in the image produced by the lens 10 and is then reflected through 90 degrees at the mirror 14 into a path parallel to the axis of the lens 10 and into the eyepiece 18, or traverses the negative element 20 of the telephoto lens and proceeds on into the camera 8 where it forms an image on the film 9, according as an instrument is being used as a telescope or as a telephoto lens. The four reflections undergone by the light in passing from the lens 10 to the eyepiece 18 when the instrument is used as a telescope serve to invert and reverse the image produced by the lens 10, so that the image observed in the eyepiece 18 is seen completely erect.

The instrument may be transformed from a telescope into a telephoto lens by removing from the optical axis of the system the mirror 14 and lens 21 and substituting therefor at the appropriate plane a negative lens 20 which provides, in conjunction with the positive lens 10, a telephoto lens of the usual type. The opening 5 in the housing 4 and the adaptor ring 7 for the accommodation of the camera 8 are located with their axes coincident with that of the telephoto lens so provided. The transformation of the instrument from a telescope to a telephoto lens is accomplished by the rotation of a mount 25, which is journaled in the housing 4 and which carries the negative lens 20, the corrector lens 21 and the mirror 14. The mount 25 has two positions of angular equilibrium. The first of these may be called the telescope position, in which the corrector lens 21 and the mirror 14 are inserted in the optical axis of the system. The second may be called the telephoto position, in which the negative lens 20 is inserted in the optical axis of the system. The mount 25 is connected to the housing 4 by a spring 29 which tends to rotate it from the telescope to the telephoto position. Further rotation past the telephoto position is prevented by the abutment of a shoulder 30 on the mount 25 against a stop 31 on the housing 4. The mount 25 may be rotated from the telephoto position to the telescope position by means of a cocking knob 26 which protrudes through the housing 4. When the mount has been turned back against the spring 29 to the telescope position, a pawl 32, pivoted in the housing, engages it and prevents it from returning to the telephoto position until the pawl is released by a release trigger 27, which also protrudes through the housing 4. When the release

4 trigger is pressed, the mount quickly snaps back to the telephoto position. A detent is provided on the housing which engages the mount as it comes to rest in the telephoto position so as to prevent vibration thereof and resultant blurring of the photograph.

In order to make possible the exposure of the film 9 in the camera 8 as soon as possible after the objects to be photographed have been brought into focus in the telescope, means are provided to operate the shutter of the camera upon pressing the release trigger 27. A fitting 40 on the exterior of the housing 4, illustrated in Fig. 2, accommodates a cable release 41 connecting to the camera 8. By means of conventional mechanism operatively associated with the mount 25 but not claimed as a part of the present invention, a spring within the fitting 40, which bears against the end of the cable release, is compressed as the mount 25 is rotated from the telephoto to the telescope position. When the release trigger 27 is pressed, allowing the mount to return to the telephoto position, this mechanism releases the spring in the fitting 40 after the mount 25 has come to rest in the telephoto position and effects operation of the shutter in the camera 8 through the cable release 41.

The telescope formed of the lenses 10 and 21 and of the eyepiece 18 and the telephoto lens formed of the lenses 10 and 20 are provided with adjustable focus by means of a focusing assembly 50, which carries the mirrors 12 and 13 and permits shortening and lengthening of the optical path length between the positive lens 10 and the eyepiece 18 and between the positive lens 10 and the negative lens 20. The assembly 50 is engaged by a screw 51 mounted against lengthwise motion in the housing 4, so that rotation of the screw advances the assembly 50 with respect to the housing. The screw 51 carries on its end a pinion 52 engaging a gear 53 which protrudes through the side of the housing and which may be turned with the thumb. The circumference of the gear 53 may be calibrated in units representing the range for which the telescope and telephoto lens are focused, as indicated by reference to a fixed point on the housing past which the gear rotates.

Midway between the mirrors 12 and 13 on the assembly 50 is located an iris 55 for adjustment of the aperture of the system, telephoto lens or telescope. The aperture of the iris 55 is varied by means of an iris control 57 which connects through a telescoping shaft to a knurled wheel 58 protruding through the housing 4. The wheel 58 is shown in Fig. 2.

Since the telescope is intended to provide accurate focus on the film 9 of the objects sought to be photographed by means of the telephoto lens, the lenses 20 and 21 and their locations, with reference to the housing 4, are computed so that for any position of the assembly 50 objects which are in focus at the plane of the film when the mount is in the telephoto position will be in focus in the telescope when the mount is in the telescope position. Objects in focus in the telescope may be described generally as objects whose images produced by the positive lens 10 and the corrector lens 21 lie at the focal plane of the eyepiece 18, so that the photographer may view the image produced by the eyepiece with his vision accommodated for infinity.

However, in order to insure accurate focusing by the telephoto lens on the film of images of those objects which the photographer chooses as the subjects of his photograph, means must be provided to compensate for possible inability of the photographer's eye to accommodate for infinity and to prevent the accommodation of the eye from inferring proper focus of the telescope, and hence of the telephoto lens, by adjusting to images produced by the telescope at planes other than the focal plane of the eyepiece. This limitation on the accommodation of the eye is achieved by providing a ground glass screen 35 which may be inserted in the optical axis of the telescope at a plane fixed with reference to the housing and which is equivalent in focus to the plane of the film 9. The eyepiece is movable along its own axis in the housing to permit the photographer to bring the grain of the ground glass screen into visual focus with his eye relaxed. The ground glass screen is mounted on a lever 36 pivoted in the housing 4 which permits the ground glass screen to move in its own plane into or out of the optical axis of the eyepiece 18 under the influence of a control button 37, which may be manipulated from outside the housing 4.

Because the ground glass screen 35 serves to catch the real image of the positive lens 10 only, insensibly modified in linear dimensions by the low power corrector lens 21, it need not be large. The impression of size given to the photographer looking through the eyepiece is due to magnification produced by the eyepiece. In particular the ground glass screen 35 need not be so large as the film 9 on which the photograph is to be taken.

The eyepiece 18 is a true ocular, designed to magnify the image in space produced by the elements 10 and 21, as well as to magnify the rear object provided when that image is caught on the ground glass screen 35. It thus provides, upon the removal of the ground glass screen, a telescope of high quality making use of more of the light that is brought to a focus at the plane of the ground glass screen than would be the case if the eyepiece 18 were a simple magnifier. The eyepiece 18 protrudes from the back of the housing 4 and is provided with an eyeguard 19 which serves to exclude undesired light and to permit bracing of the instrument against the photographer's head.

The operation and advantages of the invention will now be described by reference to Fig. 2, which is a side view of a completed instrument embodying my invention, showing the controls used in its operation. Although the instrument may be used simply as a terrestrial telescope, it is designed to function basically as a telephoto lens. In Fig. 2, is shown, therefore, a photographic camera 8 mounted on top of the housing 4. The normal objective of the photographic camera is removed and the bayonet ring 6 on the top of the housing engages an adapter ring 7 of the proper height fitted into the lens mounting ring of the camera 8. The camera may be mounted on the housing in either of two azimuths 90 degrees apart, according to the shape of the object to be photographed. Rotation of the camera about a vertical axis thus serves the same purpose as that achieved with the normal hand-held camera by turning the camera over in the photographer's hands. The camera shutter is connected by means of a cable release 41 to a fitting 40 and thence by conventional mechanism (not shown) to the mount 25.

In use, the instrument is grasped by the housing 4 and held with the eyeguard 19 against the eye of the photographer. In taking a photograph, the photographer first adjusts the eyepiece 18 for the accommodation of his eye so as to bring into focus, as regards the action of the eyepiece 18, images which appear at the plane of the ground glass screen 35. The ground glass screen is inserted into the optical axis of the eyepiece by means of the control button 37, and the eyepiece is focused on the grain of the ground glass. The ground glass screen is next swung out of the way and the mount 25 is turned to the telescope position by means of the cocking knob 26. The subject of the photograph is then chosen by means of the telescope and its image is brought into preliminary focus by adjustment of the gear 53. For exact focus the ground glass screen 35 is swung back into the field of view of the eyepiece and the image of the object to be photographed is brought into exact focus thereon. The iris 55 is then adjusted by means of the knurled wheel 53 to provide the desired aperture, in accordance with photographic practice. With the image properly centered in the ground glass screen, the film is exposed by pressing the release trigger 27. This shifts the mount 25 to the telephoto position and snaps the shutter of the camera 8 through the cable release 41, after the mount 25 has come to rest in the telephoto position.

Although my invention has been described in terms of a specific embodiment, it is susceptible of variation in details without departing from the scope thereof. The ordering and orientation of the reflectors employed to connect the optical axis of the several lenses may for example be changed, and also the means employed to substitute the eyepiece for the negative element of th telephoto lens in the optical axis of the positive lens. Various modifications may be made within the scope of the appended claims.

I claim:

1. A telescope and telephoto lens comprising a housing, a front positive lens, a telescope eyepiece adjustably mounted in said housing, a mounting for a photographic camera arranged on said housing in fixed spatial relation to said positive lens, a plurality of reflectors adapted to bring the optical axis of said positive lens into coincidence with the optical axis of said camera mounting and to vary the optical path length therebetween, a rotatable reflector and an associated lens of low power both adapted to be inserted in the optical axis of said camera mounting and to bring the optical axis of said positive lens into coincidence with the optical axis of said eyepiece so as to permit said eyepiece and said positive lens to function as a telescope, a negative lens adapted to be inserted in the optical axis of said camera mounting alternately to the insertion therein of said rotatable reflector and associated lens of low power and forming with said positive lens a telephoto lens combination, said lens of low power and said negative lens being so computed that points in the object space whose conjugates lie in a first image plane fixed with reference to said housing and on which said eyepiece can be focused, when said rotatable reflector and associated lens are interposed in the optical axis of said camera mounting, are conjugate also to points in a second image plane fixed with reference to said camera mounting, when said negative lens is interposed in the axis of said camera mounting, and a ground glass screen of an area sufficiently large to accommodate the real image formed by said positive lens and said lens of low power and pivotally mounted in said housing for insertion into the axis of said eyepiece at said first image plane.

2. A compact erecting telescope and telephoto lens comprising a housing, a positive lens, an eyepiece adjustably mounted in said housing, four mirrors serving to erect the image presented by said positive lens to said eyepiece, to provide said positive lens and eyepiece with a common optical axis, and to increase the optical path between said positive lens and eyepiece above their geometrical separation, the second and third of said mirrors, numbered consequently from said positive lens, being jointly movable with respect to said housing so as to vary the length of said path, an opening in said housing for the accommodation of a camera with its optical axis coincident with that joining the third and fourth of said mirrors, a negative lens and a corrector lens, a mount bearing the fourth of said mirrors and said negative lens and corrector lens, said mount being rotatable in said housing between two positions, in the first of which light passing through said positive lens passes through said corrector lens and is reflected at the fourth of said mirrors into said eyepiece, and in the second of which said light passes from the third of said mirrors through said negative lens into said opening, said negative lens and corrector lens being so computed that with a given adjustment of said eyepiece, for any position of said second and third mirrors objects imaged at a first plane fixed with reference to said eyepiece when said mount is in the first of said two positions are imaged in a second plane fixed with reference to said opening when said mount is in the second of said two positions, and a ground glass screen pivotally mounted in said housing for insertion in the optical axis of said eyepiece at said first plane.

3. A combined erecting telescope and telephoto lens comprising a housing, a positive lens, an eyepiece, a plurality of reflectors disposed in said housing so as to bring said eyepiece into optical alignment with said positive lens and to adjustably increase the optical path length between said eyepiece and said positive lens over the geometrical separation thereof, an opening in said housing for the accommodation of a camera having a photosensitive surface in a plane fixed with reference to said housing, a negative lens, a corrector lens, a mount bearing said negative lens and corrector lens and that one of said reflectors nearest said eyepiece, said mount being rotatable in said housing between two positions so as to bring into optical alignment said positive lens, corrector lens and eyepiece and alternately said positive lens, negative lens and opening, said negative lens and corrector lens being so computed that objects imaged in the plane of said photosensitive surface are also imaged in a second plane fixed with reference to said housing and which approximates to the focal plane of said eyepiece, and a ground glass screen pivotally mounted in said housing for insertion in the optical axis of said eyepiece at said second plane.

4. A telephoto lens and telescope comprising a housing, a positive lens mounted in said housing, an opening in said housing for the accommodation of a camera having a photosensitive surface in a plane fixed with reference to said housing, an eyepiece adjustably mounted in said housing, reflecting means movable in said housing for establishing an optical axis common to said opening and to said positive lens and for adjustably increasing the optical path length between said opening and said positive lens over their geometrical separation, a negative lens, a corrector lens and mirror, a mount rotatable in said housing between two positions and carrying said negative lens, corrector lens and mirror, said mount in one of said two positions presenting said negative lens to the light passing through said positive lens so as to pass said light into said opening, said mount in the other of said two positions presenting said corrector lens and mirror to said light so as to direct the same into said eyepiece, said negative lens and corrector lens being so computed that with a given adjustment of said eyepiece, for any position of said reflecting means objects imaged in the plane of said photosensitive surface when said mount is in the first of said two positions will be imaged in a plane fixed with reference to said eyepiece when said mount is in the other of said two positions, and a ground glass screen pivotally mounted in said housing for insertion in the axis of said eyepiece at said last-mentioned plane.

5. A variable focus telephoto lens optical array and view finder comprising a front positive lens, a first negative lens disposed to the rear of said positive lens, means for variably adjusting the length of the optical path between said positive and first negative lenses so as to produce an image of a distant object field at a plane located a fixed distance behind said first negative lens and containing a photosensitive surface, a second negative lens, a mirror, a rotatable mount, said first and second negative lenses and said mirror being arranged on said mount to permit substitution of said second negative lens and mirror for said first negative lens in the optical axis of said positive lens, an eyepiece adapted to magnify the image produced by said positve lens and said second negative lens and mirror when said substitution is effective, said first and second negative lenses being so related and computed that for any value of the length of the optical path between said positive lens and mount, points in the object field which are conjugate to points in the plane of said photosensitive surface are conjugate to points in a second plane at a fixed distance behind said second negative lens, a ground glass screen, and a second rotatable mount bearing said ground glass screen and adapted to permit the insertion thereof in the optical axis of the eyepiece at said second plane.

6. In combination a telescope comprising a positive lens as objective, a first negative lens of low power for correction of zonal aberration and an eyepiece, a ground glass screen insertable at the focal plane of said eyepiece, and a telephoto lens embodying the said positive lens and a second negative lens adapted to produce when substituted for said first negative lens an image on a photosensitive surface at a fixed distance behind the said second negative lens of such objects as said positive lens and first negative lens will bring to focus at the focal plane of said eyepiece.

LEONARD F. BARCUS.

REFERENCES CITED

The following references are of record in the file of this patent:

UNITED STATES PATENTS

| Number | Name | Date |
| --- | --- | --- |
| 967,143 | Arriaga | Aug. 9, 1910 |

(Other references on following page)

UNITED STATES PATENTS

| Number | Name | Date |
|---|---|---|
| 1,085,048 | Hukill | Jan. 20, 1914 |
| 1,092,861 | Von Rohr | Apr. 14, 1914 |
| 1,094,724 | Konig | Apr. 28, 1914 |
| 1,651,493 | Warmisham | Dec. 6, 1927 |
| 1,724,566 | Davidson | Aug. 13, 1929 |
| 1,879,412 | Mueller | Sept. 27, 1932 |
| 2,012,512 | Mitchell | Aug. 27, 1935 |
| 2,100,967 | Levy | Nov. 30, 1937 |
| 2,322,399 | Sperry et al. | June 22, 1943 |
| 2,327,759 | Bennett | Aug. 24, 1943 |
| 2,364,652 | Pollock | Dec. 12, 1944 |
| 2,377,821 | Sperry et al. | June 5, 1945 |

FOREIGN PATENTS

| Number | Country | Date |
|---|---|---|
| 366,038 | Great Britain | July 23, 1930 |
| 755,987 | France | Sept. 18, 1933 |
| 586,031 | Germany | Feb. 9, 1934 |

Certificate of Correction

Patent No. 2,536,866 January 2, 1951

LEONARD F. BARCUS

It is hereby certified that error appears in the printed specification of the above numbered patent requiring correction as follows:

Column 3, line 30, for the words "as an" read *as the*; column 5, line 38, for "rear" read *real*; column 6, line 38, for "th" read *the*; column 7, line 13, for "consequently" read *consecutively*; column 8, line 38, for "positve" read *positive*;

and that the said Letters Patent should be read as corrected above, so that the same may conform to the record of the case in the Patent Office.

Signed and sealed this 8th day of May, A. D. 1951.

[SEAL]

THOMAS F. MURPHY,
*Assistant Commissioner of Patents.*